United States Patent [19]

Huggins

[11] 3,999,603
[45] Dec. 28, 1976

[54] HEAT RECUPERATOR STRUCTURE

[75] Inventor: Homer D. Huggins, Racine, Wis.

[73] Assignee: Modine Manufacturing Company, Racine, Wis.

[22] Filed: Dec. 18, 1975

[21] Appl. No.: 642,060

[52] U.S. Cl. .............................. 165/111; 55/269; 62/93
[51] Int. Cl.[2] .......................................... F28B 1/06
[58] Field of Search .......... 165/111, DIG. 2; 62/92, 62/93; 34/86; 55/267, 268, 269

[56] References Cited
UNITED STATES PATENTS

| | | | |
|---|---|---|---|
| 3,386,502 | 6/1968 | Rostaing | 165/111 X |
| 3,792,572 | 2/1974 | Turbin | 165/111 |

*Primary Examiner*—Alan Cohan
*Attorney, Agent, or Firm*—Wegner, Stellman, McCord, Wiles & Wood

[57] ABSTRACT

A recuperator structure for recovering heat values from a moisture laden hot gas stream and for utilizing these heat values to heat a space such as a room in which the structure comprises first, second, third, fourth, fifth and sixth ducts with the first, second and third ducts being used for conveying air from ambient to the space and having located therein heat exchangers and the fourth, fifth and sixth ducts communicating with the same heat exchangers for conveying a hot moist gas therethrough for heat exchange with the ambient air and then exhausting to the ambient, the result being that the hot moist gas gives up its heat values in the heat exchangers to the ambient air which is then exhausted in the resulting heated condition into the room. The disclosure also includes improved defrost means for the heat exchangers immediately contacted by the ambient air for removing frost that may be deposited thereon where the heat exchanger portions that are contacted by the hot moist gas are at subfreezing temperatures.

8 Claims, 2 Drawing Figures

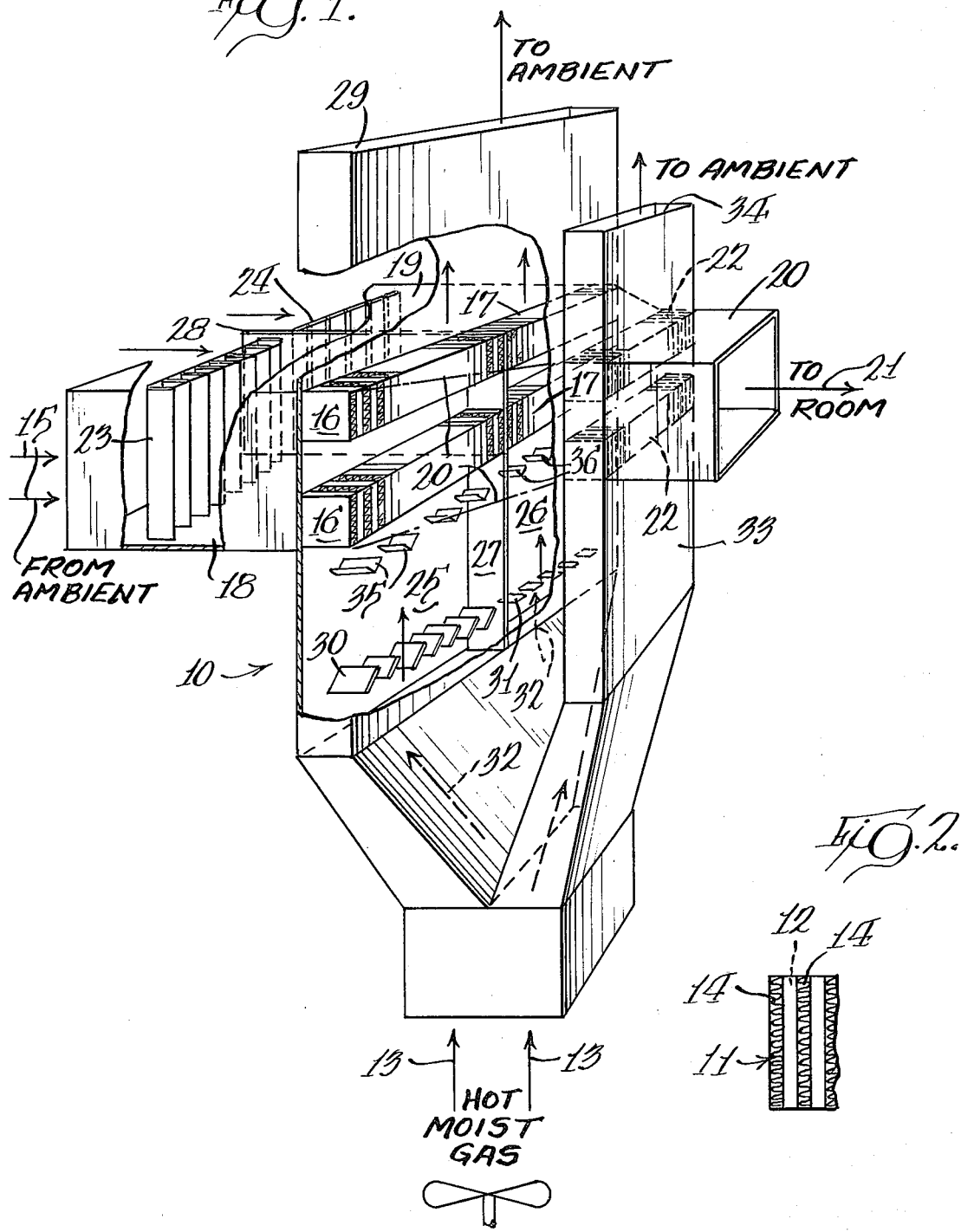

HEAT RECUPERATOR STRUCTURE

BACKGROUND OF THE INVENTION

In many installations particularly of an industrial nature there are produced gases that are hot and that contain moisture. Various means have been proposed in the past for recovering the heat from these waste gas streams and certain of these prior devices utilize the waste heat to heat a space such as a room or the interior of a building. In certain of these recuperator structures, especially where ambient air is used for the air supply to the space, problems are created in cold climates in cold seasons of the year with a frost being deposited on the heat exchangers used in the recuperator structures. The apparatus of this invention provides improved means for recovering the heat values from a moisture laden hot gas stream and for using ambient air to absorb the heat and be heated thereby for supply to the space. The present invention also provides means for periodically defrosting the recuperator system so that the frost will not interfere with the gas flow through the structure of this invention.

BRIEF DESCRIPTION OF THE DRAWINGS

FIG. 1 is a perspective view partially broken away for clarity of illustration of a recuperator structure embodying the invention.

FIG. 2 is a fragmentary side elevational view of a heat exchanger of the type that may be used in the structure of FIG. 1.

DESCRIPTION OF THE PREFERRED EMBODIMENT

In the illustrated embodiment the recuperator structure 10 comprises a plurality of heat exchangers 11, one of which is shown in fragmentary detail in FIG. 2, having separated sets of passages in heat exchange relationship with each other. A first set 12 of hot gas passages extends vertically in the illustrated embodiment and are adapted to be contacted by the hot moist gas stream 12. The second set of heat exchanger passages 14 are essentially horizontal in the illustrated embodiment and are adapted for flow therethrough of an ambient air stream 15. Each of the said passages 12 and 14 are defined by the spaces between undulating fins with these spaces in the heat exchanger 11 being generally at right angles to each other as illustrated.

Two pairs of heat exchangers 16 and 17 are each arranged in parallel in separate first 18 and second 19 ducts through which is selectively directed the ambient air 15. These first and second ducts 18 and 19 merge downstream of the heat exchangers 16 and 17 into a third duct 20 that exhausts into the space to be heated such as a room as indicated by the arrow 21. Located in this third duct is another pair of heat exchangers 22 also arranged for parallel flow therethrough. Thus, regardless of whether the air is directed through the first duct 18 or second duct 19 it passes either through the first pair of heat exchangers 16 or the second pair 17 in series with the pair of parallel flow heat exchangers 22 in the third duct 20.

All of these heat exchangers 16, 17 and 22 have the separate air passages 12 and 14 as previously described.

In order to control flow through the first and second ducts each has flow control means 23 and 24 embodied in adjustable dampers. These dampers permit directing the ambient air 15 through either of the ducts so that when the ambient air is at a subfreezing temperature and one set of heat exchangers 16 or 17 becomes partially clogged with frost flow may be directed through the other while the affected heat exchangers are defrosted in a manner to be explained hereinafter.

There are also provided fourth and fifth ducts 25 and 26 separated by a partition 27 similar to the separating partition 28 between the first and second ducts. These fourth and fifth ducts extend generally vertically and communicate with the hot gas passages 12 in the heat exchangers 16 and 17 and from there through an exhaust 29 back to ambient.

Flow control means embodied in the dampers 30 and 31 are provided in the respective ducts 25 and 26 with these dampers moving between open position as illustrated by the dampers 30 to substantially closed position as illustrated by the dampers 31. Even when closed, however, the dampers 31 for example are spaced from each other so that there is sufficient passage of hot gas 13 and 32 between the dampers 31 to defrost the respective heat exchangers which in the illustrated embodiment are the pair of heat exchangers 17.

There is also provided a sixth duct 33 for the hot moist gas 13 that directs this gas through the vertical passages 12 in these heat exchangers 22 and from there to the ambient through an exhaust end 34. Because these heat exchangers 22 are downstream from the heat exchangers 16 and 17 frost buildup is not an important problem because any frost is deposited on the first of the heat exchangers to be contacted by the ambient air 15 which would be either the heat exchanger 16 or 17 depending upon which is in use. As illustrated, of course, this is the pair 16.

During defrosting a condensate will of course be formed and will drop into troughs from the heat exchanger 16 or 17 that is being defrosted. These troughs are illustrated at 35 and 36 with the troughs 36 being in use in the illustrated embodiment because these are located beneath the heat exchangers 17 which in the embodiment are in the stage of being defrosted. The troughs 35 and 36 of course comprise condensate collecting means and from which the condensate may be directed to the exterior of the recuperator by any of the customary means desired.

Heat exchangers of the type shown here at 11, 16, 17 and 22 are disclosed in my copending application Ser. No. 595,623, filed July 14, 1975, and assigned to the assignee hereof.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A recuperator structure for recovering heat values from a moisture laden hot gas stream, comprising: a plurality of heat exchangers having separated sets of passages therethrough in heat exchange relationship with each other, a first set of said passages having means for directing said gas stream therethrough and the second set of said passages having means for directing ambient air therethrough and to a space; means for arranging said heat exchangers in first and second separate banks comprising first and second ducts; a common exhaust third duct leading from said first and second ducts downstream from said heat exchangers; a heat exchanger in said third duct having separated sets of passages therethrough in heat exchange relationship with each other, a first set of said passages having means for directing said gas stream therethrough and the second set of said passages having means for directing said ambient air from said first and second ducts therethrough and to a space; first and second flow control means in each said first and second ducts for directing said ambient air selectively through said first and second ducts while maintaining said other duct of said first and second ducts dormant; fourth and fifth ducts for said hot gas leading through said first set of passages in said first and second ducts heat exchangers; and flow control means in each said fourth and fifth ducts for directing said hot gas leading through said first set of passages in said third duct heat exchanger.

2. The structure of claim 1 wherein said flow control means in each of said first and second ducts comprise variable dampers located upstream from the respective heat exchangers and the flow control means in each of said fourth and fifth ducts comprise variable dampers located upstream of the respective heat exchangers.

3. The structure of claim 1 wherein there are provided a pair of said heat exchangers for parallel air flow therethrough in the first and second ducts and a pair of said heat exchangers in said third duct for parallel air flow therethrough, the fourth, fifth and sixth ducts thereby communicating with the said first set of passages in all of said heat exchangers.

4. The structure of claim 1 wherein condensate collecting means are positioned in said fourth and fifth ducts to intercept and collect condensate falling from the heat exchangers in said fourth and fifth ducts.

5. The structure of claim 2 wherein said flow control means dampers in said fourth and fifth ducts are spaced apart when closed so as to permit hot gas to pass therebetween in limited flow to the respective heat exchangers for melting frost previously deposited on said respective heat exchangers.

6. The structure of claim 1 wherein said fourth, fifth and sixth ducts have exhaust means for exhausting to ambient and said third duct has exhaust means for exhausting to said space and thereby supplying heat to the air in said space.

7. The structure of claim 1 wherein there are provided a pair of said heat exchangers for parallel air flow therethrough in the first and second ducts and a pair of said heat exchangers in said third duct for parallel air flow therethrough, the fourth, fifth and sixth ducts thereby communicating with the said first set of passages in all of said heat exchangers and condensate collecting means in said fourth and fifth ducts to intercept and collect condensate falling from the heat exchangers in said fourth and fifth ducts.

8. The structure of claim 1 wherein there are provided a pair of said heat exchangers for parallel air flow therethrough in the first and second ducts and a pair of said heat exchangers in said third duct for parallel air flow therethrough, the fourth, fifth and sixth ducts thereby communicating with the said first set of passages in all of said heat exchangers, said fourth, fifth and sixth ducts have exhaust means for exhausting to ambient and said third duct has exhaust means for exhausting to said space and thereby supplying heat to the air in said space.

* * * * *